June 9, 1942.  R. ROWE  2,286,014
AIRPLANE ANGLE INDICATOR
Filed Jan. 28, 1941  2 Sheets-Sheet 2
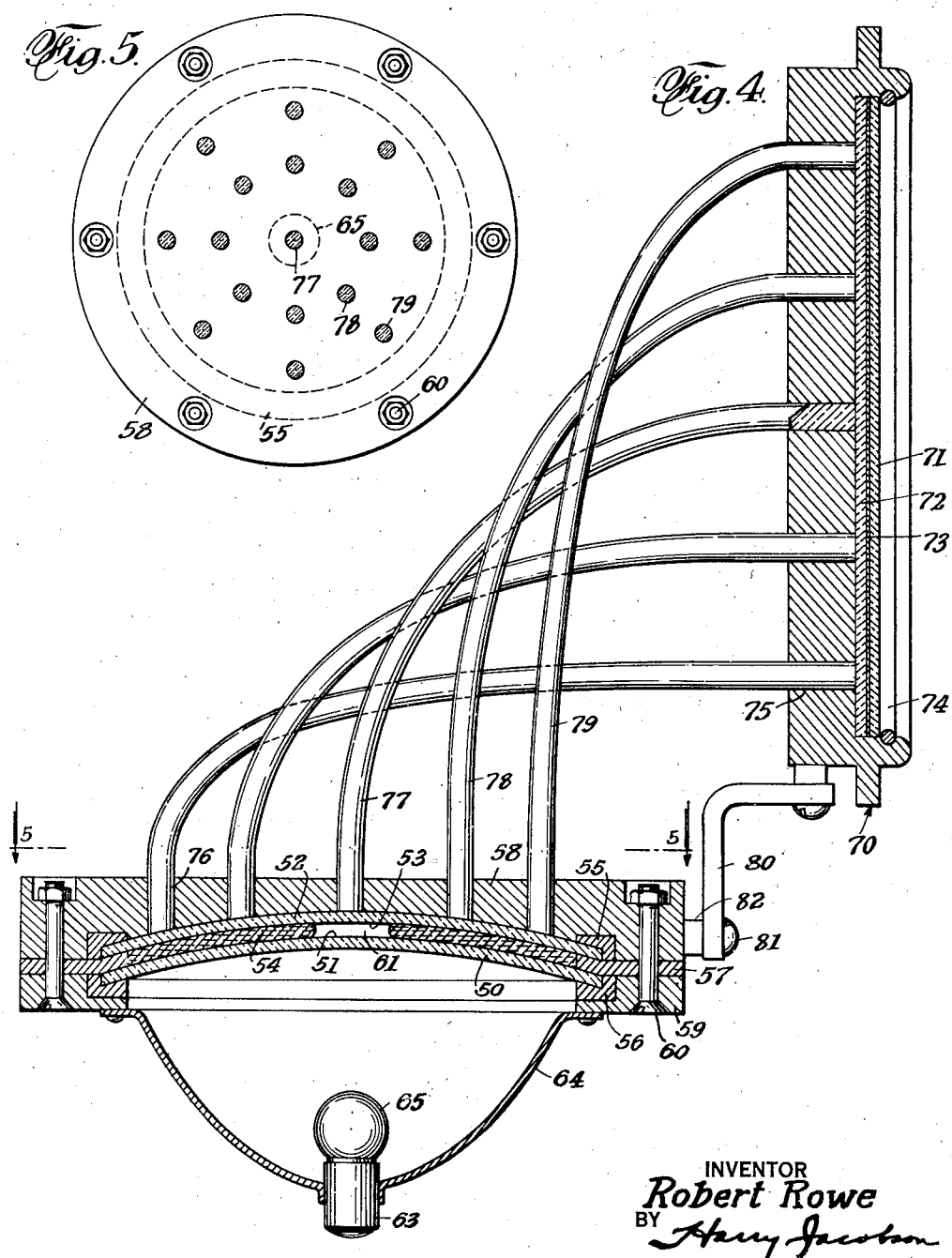
INVENTOR
Robert Rowe
BY
Harry Jacobson
ATTORNEY Patented June 9, 1942

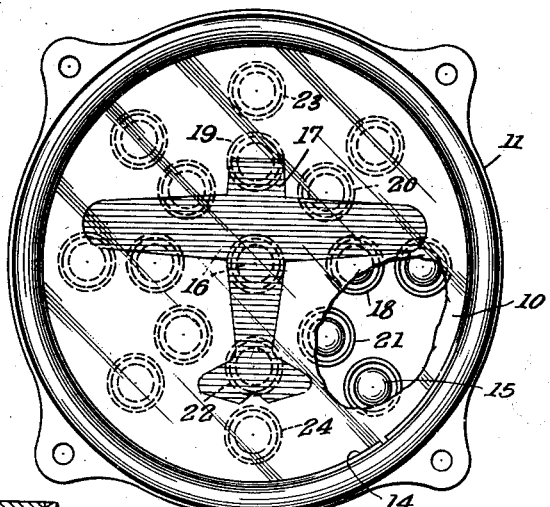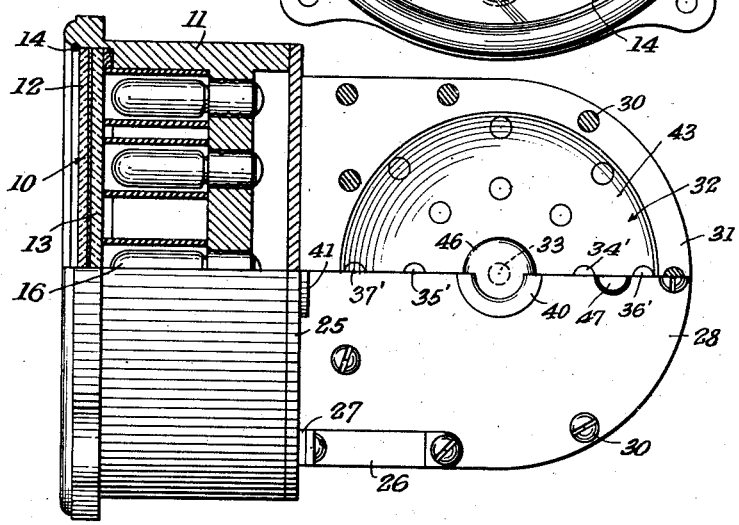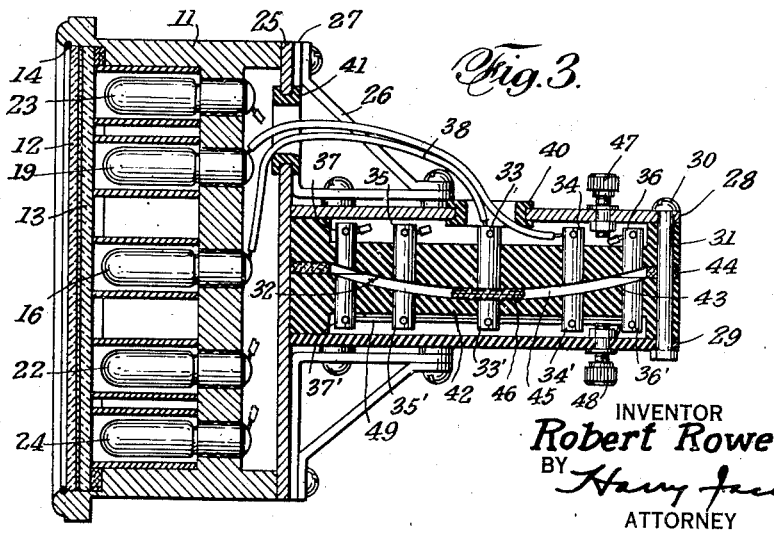

2,286,014

UNITED STATES PATENT OFFICE 2,286,014

AIRPLANE ANGLE INDICATOR

Robert Rowe, Woodside, Long Island, N. Y., assignor of thirty per cent to Stanley S. Lieberman, New York, N. Y.

Application January 28, 1941, Serial No. 376,265

3 Claims. (Cl. 33—206)

This invention relates to airplane instruments and particularly to instruments for indicating the nose to tail and side to side inclination of the airplane, or the deviation of the airplane from the normal horizontal plane thereof when flying in a horizontal straight line path.

My invention is particularly useful in training planes or those operated by student or comparatively inexperienced pilots. Many of such pilots have considerable difficulty in acquiring a perfect sense of equilibrium, and in acquiring the ability to maintain such equilibrium when putting the airplane through the various forms of maneuvers such as spirals, glides, climbing, turns and the like. Great care must be exercised by such pilots until they acquire the necessary experience to prevent tilting of the airplane excessively or into a dangerous position during such maneuvers. Such excessive tilting both before and during solo flying are the most frequent causes of accidents in preliminary training. An instrument supplementing or replacing the pilot's sense of equilibrium is therefore quite useful in shortening the training time required for pilots.

My invention therefore contemplates the provision of means for indicating the angular position of the airplane relatively to its normal horizontal position, which normal position is that assumed when flying in a straight horizontal line of flight, and for warning the pilot when safe angles are exceeded and dangerous angles approached, thereby aiding the student pilot to learn and control the safe angles of the airplane during maneuvers.

My invention further contemplates the provision of a comparatively inexpensive, easily installed and self-contained instrument sufficiently accurate for training purposes when once adjusted in its proper position in the airplane, for assisting the pilot in determining the angular tilting of the airplane from side to side or fore and aft or a combination of both and giving clear warning indications preferably by colored light signals when safe angles are exceeded.

My invention further contemplates the provision of a comparatively simple and light weight instrument for indicating with sufficient approximation the amount and direction of the tilt of the airplane in which it is installed and consequently useful for the training of inexperienced pilots as well as useful by experienced pilots under conditions of poor visibility such as fog, clouds, and darkness.

My invention further contemplates the provision of an instrument dependent upon a flowing liquid to energize the signals indicating the "attitude" or particular position of the airplane.

The various objects of the invention will be clear from the description which follows, and from the drawings, in which Fig. 1 is a front view of a preferred form of my new instrument showing the indicating dial and light indicating members thereof.

Fig. 2 is a combined top plan view and horizontal section of the same.

Fig. 3 is a vertical central section of the same.

Fig. 4 is a vertical section of a modified form of the instrument including the dial part and control part thereof, wherein rods of light transmitting material are used in place of electrically energized lamps to light selected areas of the dial.

Fig. 5 is a horizontal section taken on the line 5—5 of Fig. 4.

In the practical embodiment of my invention, my new tilt indicator is preferably made of two relatively adjustable parts, namely, a dial or indicating part and a control or signal selecting part, there being a plurality of signals in the dial part. As shown particularly in Figs. 1 to 3, the instrument dial 10 preferably of a sheet of quite translucent, though not transparent, material such as paper or treated noninflammable film having a gelatin base such as photographic film, is held in the frame 11 between the transparent sheets or plates 12 and 13 which are in turn held in place in the usual manner as by the spring ring 14 fitted to the frame. A selected area of the dial 10 corresponding to the tilted position of the airplane is illuminated by means of suitably energized signals such as the electric lamps 15 spaced apart radially as well as circumferentially and preferably arranged in concentric circular rows. For example, the middle lamp 16 is arranged preferably at the exact center or coaxially of the dial part and at a point indicating the center of gravity of the image 17 of an airplane drawn on the dial 10. Consequently, when the lamp 16 is lit to give a preferably green light, it indicates that the airplane is in its normal flying position, that is, in the position which it assumes when flying in a straight horizontal line of flight.

The next circular row of lamps of which the lamp 18 is one, is preferably amber colored and is spaced outwardly and concentrically of the center at a distance therefrom corresponding to such tilting of the airplane as would give a safe angle for climbing, gliding, banking, and the like maneuvers in all instances. That is, the lamp 19, when lit, would indicate the extreme limit of the safe angle for gliding or landing indicating that the airplane is tilted downwardly at the nose. The lamp 20 in the same row when lit would indicate the angular limit of the combined dip and bank for a landing turn. Similarly, the lamp 18 would indicate the limit of the bank for a right horizontal turn, the lamp 21 the limit of the safe angle for a climbing right turn, and the lamp 22 the limit of the safe angle for a straight line climb.

Each of the lamps of the outermost row when lit would give a red signal in connection if desired with an audible signal, indicating a dangerous inclination which the pilot could correct at once before losing control of the airplane. For example, the lamp 23 would indicate too steep a gliding or landing angle and the lamp 24 too steep a climbing angle. The relative positions of the various lamps with respect to the image 17 also indicate the respective safe or dangerous angles which the airplane assumes during maneuvers.

That part of the device for controlling the lighting of the proper lamp will now be described. Adjustably secured to the back member 25 of the frame 11 as by means of the suitably perforated and slotted brackets 26, 27 and accompanying washers, is the upper substantially circular plate 28. Similarly, the similar lower plate 29 is adjustably secured to the back 25 by means of similar angles. Said members 28 and 29 are secured together by means of suitable bolts as 30 which also serve to hold the signal controlling members in their proper adjusted and pressed together positions. One of said control members 31 has an under surface 32 of convexly spheroidal shape except at its periphery where it is preferably flat. Said member 31 is preferably molded or cast of insulating material such as a suitable plastic and has imbedded therein a series of metallic terminals such as iron terminals arranged in substantially the same general relation as the lamps 16—24 and the like. That is, the terminal 33 is at the center of the surface 32 while the next succeeding terminals as 34, 35 and the like are arranged radially outwardly of and concentric with the central terminal and in circumferentially spaced relation in the manner of the lamps 18, 19, 20, 21, etc. of the dial part of the instrument. The outermost terminals 36, 37 are arranged in about the same manner as the outermost circumferential row of lamps 23, 24 and the like of the dial part. The lead wire 38 connects the central terminal 33 with the central lamp 16. Similarly, the various terminals 34, 35 are connected to the respective opposite lamps as 19, 22 and the terminals 36, 37 are connected to the respective opposite outermost lamps 23, 24. The intermediate terminals are similarly connected to the corresponding intermediate lamps of corresponding rows by various lead wires passing through the eyelet 40 in the member 28 and through the eyelet 41 in the back member 25. Each of the lamps may be protected by a suitable shield or reflector to concentrate the light therefrom upon the desired area of the dial.

The end of each of the terminals thus far described terminates at the surface 32, whereby access may be had to said end for the closing of an electric circuit to a lamp in a manner soon to be described. The lower member 42, terminating in the concavely spheroidal surface 43 parallel to the surface 32 and of the same radius, is like the member 31 also made preferably of a suitable plastic and also has imbedded therein terminals 33', 34', 35', 36' and 37' adapted to cooperate with the respective terminals 33, 34, 35, 36 and 37 respectively to close a circuit to a selected lamp when the airplane assumes a predetermined tilt. A suitable compressible gasket as 44 is interposed between the members 31 and 42 at the flat marginal portions thereof and prevents leakage of any material arranged in the gap 45 from between said surfaces. Said gap is partially filled with a small quantity of mercury 46, the area of said quantity being less than the distance between centers of adjacent terminals and preferably somewhat greater than the diameter of each terminal. The mercury 46 is compressed between the surfaces 32 and 43, as is the gasket 44, the amount of compression being adjusted by proper manipulation of the bolts 30. Such compression has a three fold function. First, it spreads the mercury to the desired area; second, it puts sufficient pressure thereupon to prevent the mercury from flowing too easily along the surfaces 32 and 43 as the instrument, or the airplane to which it is attached, is tilted. Thirdly, the pressure upon the mercury prevents it from swinging back and forth with a pendulum action, which would otherwise cause flashing or blinking of lights and confuse the pilot. The screw terminal 47 is grounded, while the corresponding screw terminal 48 passing through the plate 29 which is of insulating material, is connected to the terminal of a battery, the other terminal of which is also grounded. From the terminal 48 extends the lead wire 49 which is also connected to an end of each of the terminals 34', 35', 36', 37', etc.

It will be noted that the instrument is adjusted in the airplane so that the mercury 46 closes or bridges that part of the gap 45 between the terminals 33 and 33' when the airplane is in its normal proper position for horizontal straight line flight. This is so because the mercury tends to fall by gravity to the lowest points of the surfaces 32 and 43. Consequently, the circuit from the battery is normally closed to the lamp 16, showing a green light on the dial to the pilot and he is thereby apprised that he is flying at the proper angle for normal flight. Should the angle be changed to the slight permissible angle for such maneuvers as a descent to a lower level, or glide or approach to a field, or for climbing, banking or side slip, the mercury moves to the intermediate circle of terminals, closing that part of the gap 45 for example between the terminals 35 and 35', or between the terminals 34 and 34' or any of the others in the intermediate circle and thereby lighting the proper one of the lamps 18, 19, 20, etc. In the event that the pilot swings the airplane to a critical angle, the proper lamp in the outermost circle furthest from the center of the dial is lit showing a bright red and warning the pilot of the dangerous angle. The light signal may if desired be supplemented by a sound signal interposed in the lines of the row of the various outermost lamps in a manner which will now be obvious to those skilled in the art and hence which need not be shown nor futher described. It will be noted that the terminals, wire connections and lamps constitute a means for illuminating a selected area of the dial, which means is controlled by the position of the liquid 46.

In that form of the invention shown in Figs. 4 and 5, the various lamps associated with the dial 10 as well as the terminals and the lead wires therebetween have been replaced by other means controlled by the movement of a liquid between spheroidal or spherical surfaces for illuminating a selected area of the dial. As shown, said means takes the form of translucent rods of a suitable plastic composition having the property of transmitting light from one end thereof to the other end regardless of the bends in the rod within practical limits. Such composition in the form of an organic plastic resin, (polymethyl methacrylate) is now being supplied to the industry under the trade-mark "Lucite" by E. I. du Pont de Nemours & Company, Inc., of New York city and Wilmington, Delaware. "Lucite" rods have the property of so transmitting light that when one end is light energized, the light energy flows through the rod to the other end thereof in the direction of the axis of the rod with comparatively small loss even though said axis may have bends therein. In this form of the invention now being described, the transparent plate 50 has a convexly spheroidal or spherical upper surface 51 and cooperates with a similar plate 52 having a concavely spheroidal or spherical surface 53 spaced somewhat above the surface 51 and parallel thereto to hold the liquid 54 therebetween. At the respective peripheries of said plates are arranged the yieldable gaskets 55, 56, and 57 to prevent leakage of the liquid out of the space between the plates and to provide also a yielding support for said plates.

The plates are clamped between the members 58 and 59 by means of a series of suitable bolts as 60, thereby to hold the liquid 54 in position for movement relatively to the plates. The lower member 59 is preferably ring-shaped having a comparatively large central opening therein. The area of the liquid when so held between the plates is slightly less than the area of the plates to provide a bubble 61 of substantial diameter somewhat greater than the diameter of the "Lucite" rods, but less than the distance between said rods. The bubble 61 is of course transparent and thereby permits light from the lamp 65 to pass therethrough and through the particular "Lucite" rod adjacent the bubble, it being understood that the bubble is free to move to the highest points of the surfaces 51 and 53 when said surfaces are moved. Preferably, the lamp 65 is suitably supported in a socket 63 secured at the center of the parabolic reflector 64 so that the light rays from the lamp are reflected parallel to each other through the bubble and into the lower end of the adjacent "Lucite" rod.

The liquid 54 is any suitable opaque liquid such as mercury or any other liquid of the type which does not for any appreciable length of time adhere to or discolor the glass or other transparent material of which the plates 51, 52 are made and with which the liquid is in contact, the liquid being preferably homogenous and non-precipitating. By the use of such liquid, no light can pass therethrough to illuminate and to be transmitted by the "Lucite" rods to the dial part 70, but such light readily passes through the bubble and is transmitted by the corresponding "Lucite" rod to illuminate a definite area of the dial when the airplane to which the instrument is attached is tilted and consequently, when the bubble 61 moves adjacent or underneath the lower end of the selected rod. The dial holder and dial is similar to that shown in Fig. 2 and comprises the parallel plates 71, 72 with the dial 73, similar to the dial sheet 10, held therebetween. The spring ring 74 holds the plates and the dial sheet in their proper positions in the dial holder, which holder is provided with apertures as 75 for the reception of the upper ends of the various "Lucite" rods.

Similarly, the upper plate 58 of the control part of the instrument is provided with holes 76 for the reception of the lower ends of the various rods. The central rod 77 has its lower end substantially vertical and arranged axially of the instrument and axially of the reflector 64, while the upper end thereof is substantially horizontal and in that opening 75 at the center of the dial holder. Arranged outwardly of the axis of the control part of the instrument and coaxially therewith is the intermediate circumferential row 78 of "Lucite" rods, the upper ends of which are positioned to correspond to the relative positions of the lamps 18 to 22, etc. illustrated in Fig. 1. The central rod 77 may be tinted green to illuminate the center of the dial with a green light at the proper time, while the rods of the row 78 may be tinted amber to illuminate the dial with amber colored areas corresponding to the amber lamps 18 to 22 shown in Fig. 1. Similarly, the outermost row 79 of the rods have their lower ends positioned in a circumferential row furthest from the axis of the reflector 64 and of the lamp 65, their upper ends being arranged to correspond to the lamps 23, 24 of Fig. 1. The rods of said row 79 are tinted red to give a red illumination to the area of the dial when light from the lamp is transmitted by the proper rod to the dial.

Adjustment of the liquid holder or control portion of the instrument relatively to the dial is rendered possible by an adjustable connection therebetween. Said connection as shown consists preferably of the angle member 80 secured at one end to the liquid holder by any suitable means such as the screw 81 passing through a suitable opening or slot of said angle member and through a suitable washer or washers 82. Similarly, the other end of the angle member is similarly secured to the dial holder 70 so that said members may be brought closer together or further apart or may be tilted to a certain extent relatively to each other as in the form of Figs. 1, 2 and 3.

Each of the light transmitting rods extends from a point adjacent the upper plate 52 to a corresponding point of the dial holder 70 and consequently is bent or distorted in such a manner as to transmit the maximum amount of light from the lamp 65 when the lower end of said rod is exposed to the light of the lamp by reason of the positioning of the bubble 61 between the lamp and the rod end. The bubble moves along the surfaces 51 and 53 toward the higher end or side of the plane as the plane is tilted and consequently reaches a position underneath the end of the proper rod indicating the tilting of the plane with respect to the figure 17 and the dial sheet 71 thereby to apprise the pilot of the degree to which the plane is tilted and the direction in which said tilting occurs.

In both forms of the invention, it will be noted that a liquid is confined between parallel substantially spherical surfaces and that tilting of the airplane moves the liquid in the correct direction to permit energization of the illuminating means which illuminates the corresponding area of the dial and thus gives the light signal desired. It will also be noted that the instrument is of comparatively simple construction and adapted for economical and rapid quantity manufacture and is well designed to carry out the purpose for which it is intended.

While I have shown and described certain specific embodiments of my invention, I do not wish to be understood as limiting myself thereto, but intend to claim the invention as broadly as may be permitted by the state of the prior art and the scope of the appended claims.

I claim:

1. In an airplane tilt indicator, a pair of curved transparent guiding surfaces, a quantity of opaque liquid confined between said surfaces, a movable bubble in said liquid, a series of spaced light conducting rods of organic plastic resin terminating adjacent one of said surfaces, and means for passing light through the bubble and into one of the rods adjacent the bubble.

2. In an airplane tilt indicator, a series of non-linear rods of organic plastic resin having light conducting properties, the lower ends of the rods being spaced in a predetermined pattern in a substantially horizontal plane and the upper ends of the rods being correspondingly spaced in a similar pattern in a substantially vertical plane, an opaque liquid having a bubble therein movable across the lower ends of the rods, and means for illuminating the selected rod adjacent the bubble.

3. In an airplane tilt indicator, a pair of substantially spherical transparent plates, an opaque liquid provided with a bubble confined between the plates, a series of non-linear light conducting rods each terminating at a different area of one of the plates and extending to a corresponding dial area, and means for illuminating the lower end of a rod adjacent the bubble as the bubble moves between said plates and correspondingly illuminating the corresponding dial area.

ROBERT ROWE.